United States Patent [19]

Davis, Jr. et al.

[11] 4,322,829
[45] Mar. 30, 1982

[54] FIBER OPTIC ACCELEROMETER AND METHOD OF MEASURING INERTIAL FORCE

[75] Inventors: Charles M. Davis, Jr., McLean, Va.; Thomas G. Giallorenzi, Washington, D.C.

[73] Assignee: Dynamic Systems, Inc., McLean, Va.

[21] Appl. No.: 186,383

[22] Filed: Sep. 11, 1980

[51] Int. Cl.$^3$ ............................ G01V 1/18; G01D 5/26
[52] U.S. Cl. ..................................... 367/178; 367/149; 350/96.29; 73/653
[58] Field of Search ............................. 367/149, 178; 350/96.29; 181/122; 73/653, 655; 29/594; 324/162

[56] References Cited

U.S. PATENT DOCUMENTS

| | | | |
|---|---|---|---|
| 2,984,110 | 5/1961 | Simek | 73/655 |
| 3,961,185 | 6/1976 | Brokershire et al. | 73/653 |
| 4,071,753 | 1/1978 | Fulenwider et al. | 367/149 |
| 4,185,503 | 1/1980 | Saito | 73/653 |

FOREIGN PATENT DOCUMENTS

| | | | |
|---|---|---|---|
| 54-138476 | 10/1979 | Japan | 73/653 |
| 655942 | 8/1951 | United Kingdom | 367/178 |
| 1475287 | 6/1977 | United Kingdom | 350/96.29 |

OTHER PUBLICATIONS

Tueten et al., "Fiber Optic Accelerometer", 10/23/80, pp. 854–856, Electronics Letters, vol. 16, #22.
Giallorenzi, "Fiber Optic Sensors", 4/81, pp. 73–78, Optics and Laser Technology", vol. 13, #2.
"Fiber-Optic Accelerometer with Hydrophone Applications", by Rines, 10/1/81, Applied Optics, vol. 20, #19.

Primary Examiner—Nelson Moskowitz
Attorney, Agent, or Firm—Kerkam, Stowell, Kondracki & Clarke

[57] ABSTRACT

A mass is attached between light reflective ends of a pair of rectilinearly aligned optic fibers and maintained in such position with the fibers under a slight tension. The pair of fibers comprise a portion of two arms of a Mach Zehnder or Michelson interferometer so that an acceleration along the longitudinal axis of the rectilinearly aligned optic fibers increases the length of one of the pair of fibers and shortens the length of the other, whereby electromagnetic rays traveling in the pair of fibers, travel different distances resulting in a phase shift which phase shift is directly proportional to the force applied to the fibers by the mass and therefore directly proportional to the acceleration. Accelerations in directions perpendicular to the longitudinal axes of the fibers cause equal phase shifts in each arm and therefore would not be detected. Thermal expansion of the fibers and acoustical noises should also balance out.

9 Claims, 6 Drawing Figures

FIBER OPTIC ACCELEROMETER AND METHOD OF MEASURING INERTIAL FORCE

DESCRIPTION

1. Technical Field

The present invention relates to the use of optical fibers as direct transduction elements in an acceleration sensor as a means for measuring inertial forces.

2. Background of Prior Art

At the present time there is increasing interest in the use of optical fibers as direct transduction elements in various types of sensors, such as hydrophones, pressure probes, thermometers, and the like. In the application of this technique, optical radiation either from a coherent source (i.e. a laser) or from an incoherent source (e.g. light emitting diode or incadescent bulb) is fed into an optical fiber that serves as the input lead to a second fiber element that is sensitive to variations of a particular physical parameter. As it passes through this sensing portion the optical beam is modulated, e.g. in phase, amplitude, or polorization by these variations. The beam is then fed through an output fiber lead to a photodetector and related circuitry, yielding an electrical output signal that is directly proportional to the magnitude of the parameter being measured.

A concept for a fiber optic rotation sensor is disclosed in a paper *Fiber-Optic Rotation Sensor Technology*—Goss et al, *Applied Optics*, Vol. 19 No. 6/15 March 1980. Details concerning analysis and optimum detection schemes is disclosed in Lin et al, *J. Appl. Opt.* 18; 915(1979).

BRIEF SUMMARY OF INVENTION

It has now been discovered that a relatively simple accelerometer can be constructed based on a fiber optic interferometer that has very high sensitivity, is relatively inexpensive, and which has sufficient reliability to be employed in an inertial guidance system.

The invention may be generally defined as including a mass which is attached to a pair of rectilinearly aligned optic fibers and maintained in such position with the fibers under slight tension. The pair of fibers form a portion of two arms of either a Michelson or a Mach Zehnder interferometer so that an acceleration having a force component along the longitudinal axis of the recilinearly aligned optic fibers increases the length of one of the pair of fibers and shortens the length of the other, whereby electromagnetic rays traveling in the pair of fibers travel different distances resulting in a phase difference which phase difference is directly proportional to the force applied to the fibers by the mass and therefore directly proportional to the acceleration.

BRIEF DESCRIPTION OF DRAWINGS

The invention will be more particularly described in reference to the accompanying drawings wherein.

DETAILED DESCRIPTION OF INVENTION

Figure 1:
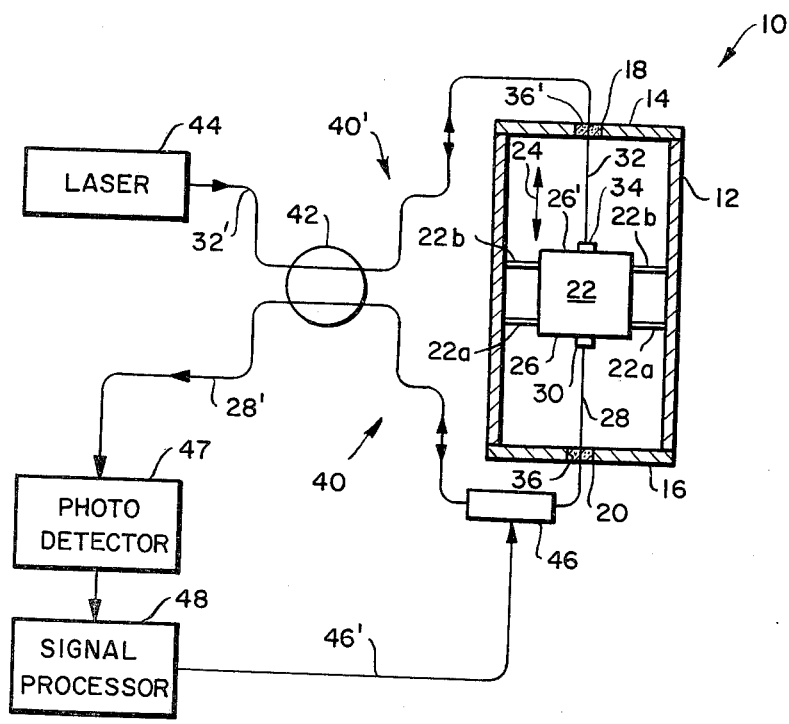
FIG. 1 is a schematic diagram illustrating a two fiber accelerometer constructed in accordance with the teachings of the present invention.

Referring to FIG. 1 of the drawing, 10 generally designates a two fiber optical accelerometer. The device 10 comprises a housing 12 having end plates 14 and 16 attached thereto. In each of the end plates 14 and 16 is a bore 18 for end plate 14 and 20 for end plate 16. Mounted within the housing or container 12 is a mass 22 which is anchored to the sidewalls of the container 12 via perforated metal diaphragm elements 22a and b, which restrict lateral motion of the mass 22, but permit motion of the mass in the direction of the directional arrow 24. To face 26 of the mass 22 is secured a single mode optical fiber 28 having a reflector 30 at the end thereof.

An equivalent optical fiber 32 and reflector 34 is mounted to face 26' of the mass 22.

Further, each of the fibers 28 and 32 is mounted in its respective bore 20 and 18 via securing means 36 and 36'. In mounting the fibers 28 and 32 in the respective end plates 16 and 14 the fibers 28 and 32 are placed under a slight tension so that any motion of the mass 22 having a component in the direction of the directional arrow increases the tension and/or length of one of the fibers and decreases the tension or length in the opposite fiber.

As to be more fully described hereinafter, the fibers 28 and 32 form a portion of the two legs 40 and 40' of a Michelson interferometer. These fibers external of the housing 12 are directed to a beam splitter designed 42 such as a bottle coupler, or other conventional beam splitters well known in the art. The portion 32' of the optical fiber 32 is connected to the output end of a source of radiation which may comprise the illustrated laser 44.

The radiation in the other leg 28 passes to an electro-optic phase shifter 46 (PZT cylinder with the fiber wrapped around it or a PVF$_2$ polymer jacket fiber) to maintain a $\pi/2$ difference in the optical phase between fibers 28 and 32 for greatest sensitivity. The phase shifter may also be useful to compensate for noise or to permit an increase in the dynamic range by 60 dB or more.

The portion 28' of the optical fiber 28 directs the optical signal from the beam splitter 42 or Bragg cell (the latter is required in the case of a heterodyne detector) to a photodector 47 and the output from the photodetector is directed to a signal processor 48 to be more fully described hereinafter.

A portion of the signal directed to the signal processor is fed back to phase shifter 46 via electrical conductor 46' to compensate for noise, etc.

The acceleration detection mechanism described hereinabove will be seen to employ an optical interferometric arrangement. The two interferring beams in optical fibers 28 and 32 are those reflected back and forth in the two fiber elements from the output from the laser 44.

Again referring to FIG. 1, if the case or housing 12 is accelerated vertically upward along the axes of the directional arrow 24, there would be an increase in the axial strain of the upper fiber 32 and a decrease in the strain in the lower fiber 28, since they provide the forces required to support and accelerate the inertial mass 22. The magnitude of these strains and the associated optical phase shift are considered in detail in the following.

Assume that the fiber elements 28 and 32 supporting the inertial mass 22 each have a length L between the mirrored ends 30 and 32, that is fixed in the mass, and the feed through section, which is rigidly attached to the ends 14 and 16 of the case 12. These elements effectively serve as springs that support the mass 22. Thus, if the housing case if given an acceleration vertically upward, the upper fiber would elongate by $\delta L$ and the lower one would shorten by the same amount in providing for force F required to accelerate the mass. This may be written as $$F = 2A\delta T = ma, \tag{1}$$

Where A is the cross sectional area of the fiber and $\delta T$ is the magnitude of the change of the tensile in each fiber. The resulting change in tensile strain $\delta S = \delta L/L$ is given y $$\delta S = (\delta T/Y) = (m/2YA)\, a, \tag{2}$$

where Y is the Young's modulus of the fiber.

Consider next the optical beam propagating in one of the fibers. Its total phase shift $\phi$ in traveling back and forth in the length L is given by $$\phi = (4\pi/\lambda)nL, \tag{3}$$

where $\lambda$ is the optical wavelength in vacuum and n is the fiber's index of refraction. In general, the change $\phi$ may be written as $$\delta\phi = (4\pi/\lambda)(n\delta L + L\delta n). \tag{4}$$

For the case of the tensile strain, however, the $\delta L$ term $$\delta\phi = (4\pi/\lambda)\cdot n\delta L = (4\pi/\lambda)nL\delta S. \tag{5}$$

Substituting from Eq. 2

$$\delta\phi = (8\pi n/Y\lambda)(Lm/d^2)a, \tag{6}$$

where d is the fiber diameter. Note that the relative phase difference $\delta\phi'$ between the beams propagating in two fibers is $2\delta\phi'$.

For a typical fiber n=1.5, $Y=7.3\times10^{11}$ dyne/cm$^2$ and assuming that $\delta\phi_{min}=10^{-6}$ radian is the minimum detectable optical phase difference (thus $\delta\phi_{min}=0.5\times10^{-6}$ radian), the minimum detectable acceleration a is given by $$a_{min} = 3.0 \times 10^4 \lambda \frac{d^2}{mL} \frac{g}{cm} /sec^2. \tag{7}$$

Further, taking $\lambda=1$ micron, d=100 micron and L=1 cm, the minimum detectable acceleration would be $10^{-3}$ cm/sec$^2$ = 1 micro g if the mass were 0.3 grams.

It should be noted that the displacements of the mass 22 corresponding to the $\delta\phi'$ phase shift limits of the 50 dB dynamic range under consideration here, i.e. $\delta\phi_{min}=10^{-6}$ radian and $\phi'_{max}=10^{-1}$ radian, are $1.6\times10^{-7}$ and $1.6\times10^{-2}$ micron, respectively. Referring to the schematic diagram shown in FIG. 1, the corresponding changes in length of the diaphragm elements 22a–d, employed to prevent lateral motion of the mass, would be reduced from these latter values by a factor of $10^{-5}$ if the diaphragm were only 1 mm in length, becoming even smaller if the diaphragm length were larger.

Consideration of this latter point makes it evident that the presence of the diaphragm should not affect the fundamental resonance frequency $f_r$ of this type of accelerometer. Again, referring to FIG. 1, the effective spring force F, required to displace the mass 22 a distance x, along the axis of fibers is given by $$F = -(2YA/L)x = -kx, \tag{8}$$

where k is the effective spring constant. Thus $$f_r = \frac{1}{2\pi}\sqrt{\frac{k}{m}} = \frac{1}{2\pi}\sqrt{\frac{2YA}{Lm}}. \tag{9}$$

To further emphasize the dependence of $f_r$ on the fiber parameters Eq. (9) may be rewritten as $$f_r = \sqrt{\frac{Y}{8\pi}}\sqrt{\frac{d^2}{Lm}}. \tag{10}$$

Thus, for the parameters considered above (i.e. $Y=7.3\times10''$ dyne/cm$^2$, d=100 microns, L=1 cm, and m=0.3 grams), and resonant frequency would be 3.1 kHz. In this case, damping should not be required since the frequency response, i.e., the optical phase difference $\delta\phi'$ versus frequency at constant acceleration, would be constant from DC to at least 1 kHz for this fundamental mode of motion. If the results of initial testing indicate that damping is required, constricted air flow in the housing 12 rather than liquid damping would be preferable.

Figure 2:
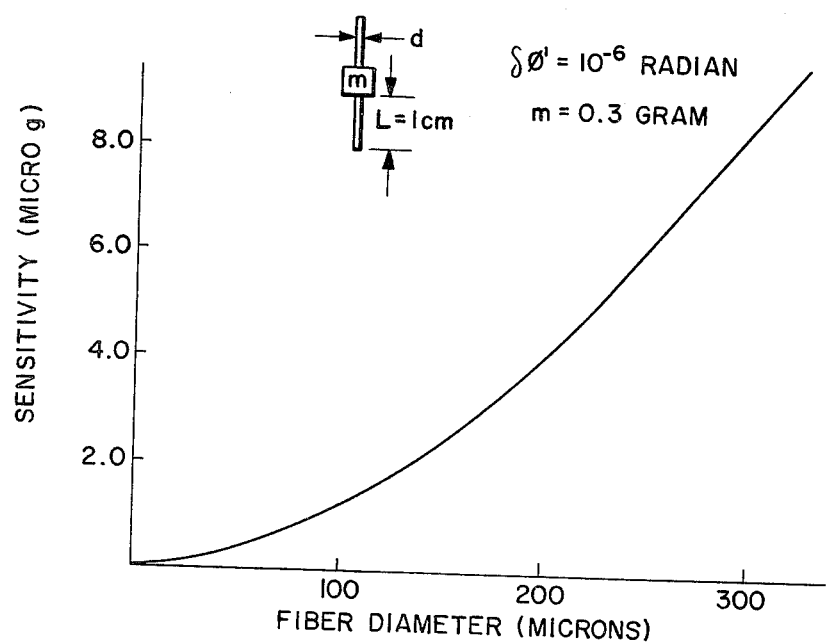
FIG. 2 is a graph illustrating the sensitivity of a two fiber accelerometer, such as illustrated in FIG. 1 wherein the acceleration is in micro g required to produce a phase difference $\delta\phi'$ equal to 1 micro radian, as a function of the fiber diameter d.
Figure 3:
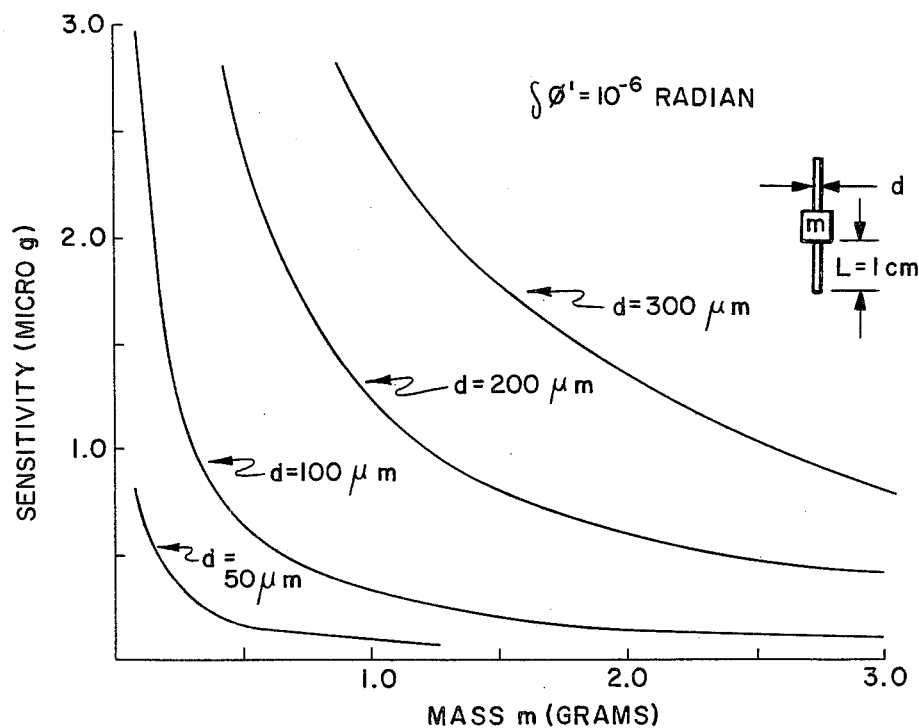
FIG. 3 is a graph illustrating the sensitivity of a two fiber accelerometer as a function of the inertial mass m for various fiber diameters.
Figure 4:
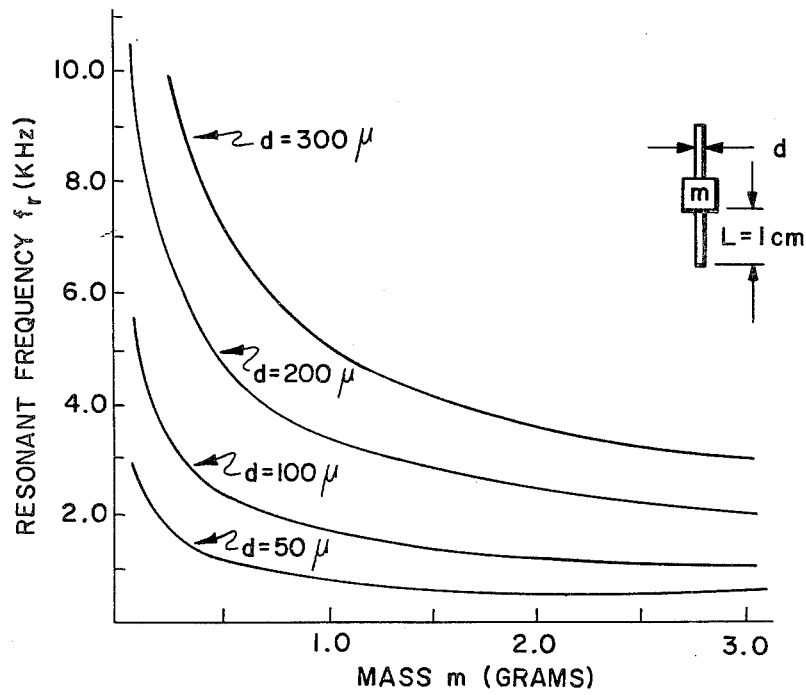
FIG. 4 is a graph illustrating the resonant frequency $f_r$ of a two fiber accelerometer as a function of the mass m for fibers of various diameters d.

It may be seen from Eqs. (7) and (10) that the minimum detectable acceleration increases as the square of the resonant frequency and/or of the fiber diameter. The latter point is indicated explicitly in FIG. 2 where the sensitivity, i.e. the acceleration required to produce a phase difference of $10^{-6}$ radian, is plotted as a function of the fiber diameter d. In FIG. 3, the dependence of the sensitivity on the inertial mass is plotted for fibers of various diameter d, while the resonant frequency $f_r$, as a function of mass and fiber diameter d, is shown in FIG. 4.

EXAMPLE I

The following components will provide a useful two fiber accelerometer of the type illustrated and described in reference to FIG. 1 of the drawing:

1. Weight of mass 22
   1 gram
2. Dimensions of housing 12
   3 cm×0.5 cm inside diameter
3. Diameter and type of fiber
   80 um cladding diameter single-mode fiber
4. Length of fibers 28 and 32 within the housing 12
   1 cm each 5. Type of laser 44
   Gas Laser (eg. HeNe)
   Injection laser (AlGaAs)
6. Type of beam splitter 42
   3 db coupler (ie beam splitter)
   Bragg cell is Heterodyne detection is used in which case 32 & 28 would be at different frequencies.
7. Type of photodetector 47
   photodiode
8. Type of signal processor 48
   spectrum analyzer Now referring to FIG. 5 of the drawing illustrating a modified form of the present invention, 10' generally designates a two fiber optical accelerometer. The device 10' comprises a housing 12' having end plates 14' and 16' attached thereto. In each of the end plates 14' and 16' is a bore 18' for end plate 14' and 20' for end plate 16'. Mounted within the housing or container 12' is a mass 22' which is anchored to the sidewalls of the container 12' via perforated metal diaphragm elements 22'a and b, which restrict lateral motion of the mass 22', but permit motion of the mass in the direction of the directional arrow 24'. To face 26" of the mass 22' is secured a single mode optical fiber 28".

An equivalent optical fiber 32" is mounted to face 26" of the mass 22'.

As distinguished from the form of the invention illustrated in FIG. 1, the ends of fibers 28" and 32" do not terminate at the faces of mass 22'. Instead each fiber 28" and 32" passes freely under no tension through bores 27 and 29 in the mass 22' thence through opening 33 in casing 12' to coupler 35.

Each of the fibers 28" and 32" is mounted in its respective bore 20' and 18' via securing means 37 and 37'. In mounting the fibers 28" and 32" in the respective end plates 16' and 14' the fibers 28" and 32" are placed under a slight tension so that any motion of the mass 22' having a component in the direction of the directional arrow 24' increases the tension and/or length of one of the fibers and decreases the tension or length in the opposite fiber.

As to be more fully described hereinafter, the fibers 28" and 32" form a portion of two legs 41 and 41' of a Mach Zehnderinterferometer. These fibers external of the housing, designated 28a and 32a, 12' are directed to a Bragg cell designated 42' such as a bottle coupler, or other conventional beam splitters well known in the art.

The Bragg cell for heterodyne detection or the phase shifter 46" (for homodyne detection) receives radiant energy from the laser 44'. From the beam splitter the two beams of radiant energy are directed to the mass 22'. It will be noted the fiber 28a is first directed to a phase shifter 46" having feed back conductors 49, for homodyne detection as discussed in reference to FIG. 1.

The radiant energy in the fibers 28" and 32" are modified by the mass 22' and then directed to the coupler 35 such as a bottle coupler in the non-tensioned segments of fibers 28" and 32" which directs the modulated light through a single fiber to optical fiber 52 to the detector 56 and via electrical connection 58 to the signal processor 60. It will be recognized by those skilled in the art that upon acceleration in the direction arrow 24' the signals in the fibers 28" and 32" downstream of the fibers rigid attachment to the mass 22' will be interfering beams when received by the modulator 35.

EXAMPLE II

Figure 5:
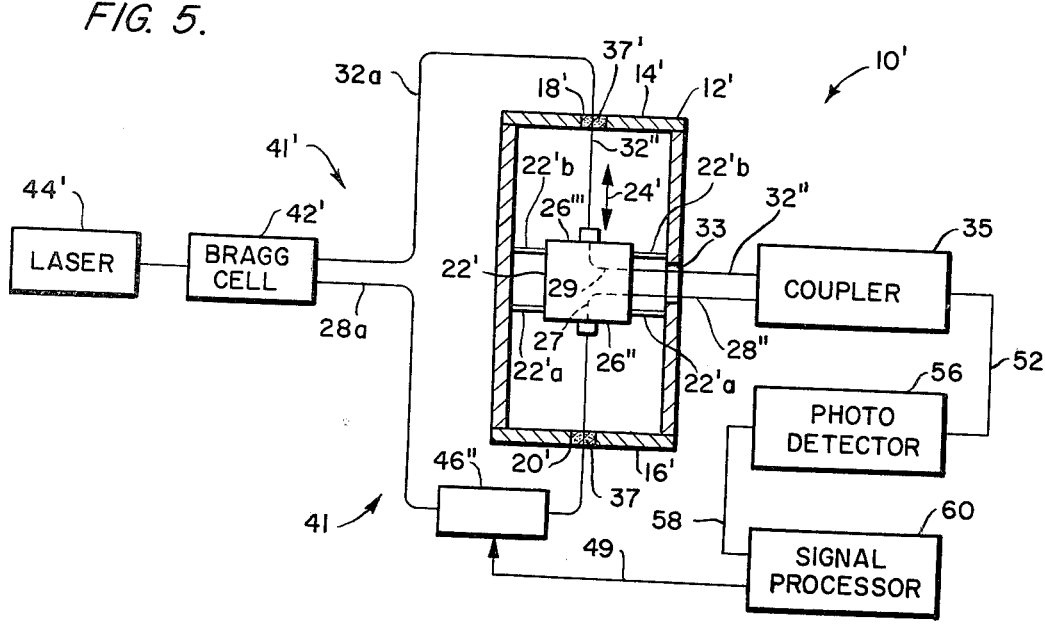
FIG. 5 is a schematic diagram of another configuration of a two fiber accelerometer constructed in accordance with the teachings of the present invention.
Figure 6:
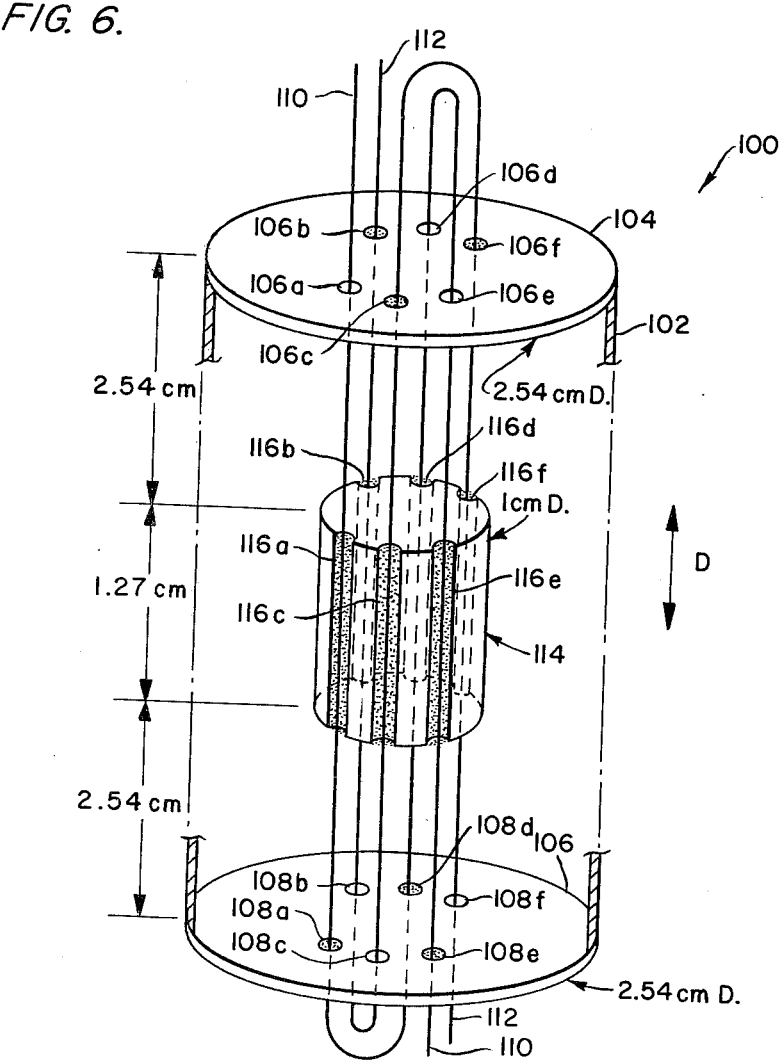
FIG. 6 is an enlarged diagramic showing of a plural fiber accelerometer constructed in accordance with the teachings of the present invention.

The following components will provide a useful two fiber accelerometer of the type illustrated and described in reference in FIG. 5 of the drawing:

1. Weight of mass 22'
   1 gram
2. Dimensions of housing 12'
   3 cm × 0.5 cm inside diameter
3. Diameter and type of fiber
   80 μm single-mode
4. Length of fibers 28" and 32" within the
   ≃2 cm
5. Type of laser 44'
   Gas laser (e.g. HeNe)
   Injection laser (AlGaAs)
6. Type of beam splitter 42'
   3 db beam splitter for homodyne detection
   Bragg cell for heterodyne detection
7. Type of coupler 35
   3 db coupler
8. Type of photodetector 56 photodiode
9. Type of signal processor 60 spectrum analyzer Referring to FIG. 6 of the drawings, 100 generally designates a plural fiber optical accelerometer. The Device 100 comprises a cylindrical housing 102 having end plates 104 and 106 attached to the end of the cylindrical housing. In end plate 104 are a plurality of bores designed 106a, b, c, d, e and f. End plate 106 is provided with a plurality of corresponding bores designated 108a, b, c, d, e and f.

Through the bores are mounted or strung a pair of optical Fibers 110 and 112.

Fiber 110 passes freely through bore 106a and is cemented in bore 108a in end plate 106 thence the fiber is doubled back on itself to pass through bore 108d with the fiber again being cemented to the bore thence the fiber passes freely through bore 106d in end plate 106 to doubleback and pass through bore 106f. The fiber is cemented in the bore 106f then the fiber passed downwardly through opening 108f in end plate 106 and the fiber is in a free state in the bore 108f.

Fiber 112 is cemented in bores 106b, 106c and 106f while passing freely through bores 108b, c & f.

Thus it will be seen that fiber 110 is anchored to end plate 106 while fiber 112 is anchored end plate 104.

Between the end plate 104 and 106 is a mass designated 114 which mass for example might be 1 centimeter in diameter. The mass 114 is cylindrical in shape and has a length of 1.27 centimeters as illustrated on the drawing and is positioned 2.54 centimeters for each end plate 104 and 106. The mass 114 is provided with a plurality of longitudinally extending peripheral grooves 116a, b, c, d, e and f which correspond to the bores 106a, b, c, e and f and 108a, b, c, e and f in end plates 104 and 106.

As illustrated in the fiber runs of fibers 110 and 112 are positioned in the grooves and cemented therein such that the weight or mass 114 is under tension in respect to the fibers in bores 106a, d, and c of end plate 106.

The fibers 110 and 112 entering and leaving the container 102 are connected to a laser and Bragg cell or bottle coupler at one end and to a beam splitter, photodetector and signal processor at the other end as described in detail in respect to FIG. 5 of the Application.

The form of the invention using plural runs of the two fibers provides for more accurate detection of acceleration in a direction indicated by directional arrow D in a very small compact unit as a greater length of fibers are placed under tension in a smaller unit.

We claim:

1. An accelerometer comprising;
a housing;
a mass mounted in said housing for limited rectilinear movement along one axis of the mass;
a pair of optic fibers;
means attaching said mass to the optic fiber so that the pair of fibers are in rectilinear alignment along said one axis;
means attaching said pair of fibers under tension to said housing;
means for directing radiant energy into each of the pair of fibers;
means for detecting the radiant energy in said pair of fibers;
means for directing a signal from the detecting means to a signal processor wherein the signal processor detects any axial signal resulting in a phase difference in the rays traveling in said pair of fibers, which phase difference is directly proportional to the force applied to the pair of fibers by movement of the mass along said one axis.

2. An accelerometer comprising:
a housing;
a mass mounting in said housing for limited rectilinear movement along one axis of the mass;
a pair of optic fibers;
means attaching said mass to the optic fiber so that the pair of fibers are in rectilinear alignment along said one axis;
means attaching said pair of fibers under tension to said housing;
means for directing radiant energy into each of the pair of fibers;
photodetector means for detecting the radiant energy in said pair of fibers;
means for directing a signal from the photodetector to a signal processor wherein the signal processor detects any axial signal resulting in a phase difference in the rays traveling in said pair of fibers, which phase difference is directly proportional to the force applied to the pair of fibers by movement of the mass along said one axis.

3. The accelerometer as defined in claim 1 wherein each of the pair of fibers terminates at said means attaching said fibers to said mass and radiant energy reflecting means at each said termination.

4. The accelerometer as defined in claim 2 wherein each said fiber terminates downstream of the mass at a radiant energy modulator and said modulation is optically connected to the photodetector.

5. The accelerometer as defined in claim 1 wherein each of said pair of fibers is folded and passes at least twice through said housing and at each pass is attached to said mass within said housing.

6. An accelerometer comprising a housing having a pair of parallel end plates at least a pair of optic fibers having intermediate portions within said mass to place the fibers under tension in a rectilinear direction;
means for directing radiant energy into each of the pair of fibers;
photodetector means for detecting the radiant energy in said pair of fibers;
means for directing a signal from the photodetector to a signal processor wherein the signal processor detects any axial signal resulting in a phase difference in the rays traveling in said pair of fibers, which phase difference is directly proportional to the force applied to the pair of fibers by movement of the mass along said one axis.

7. The accelerometer as defined in claims 1 or 5 wherein each of said at least one pair of fibers terminates at said means attaching said fibers to said mass and radiant energy reflecting means at each said termination.

8. The accelerometer as defined in claims 1 or 5 wherein each said at least one pair of fibers terminates downstream of the mass at a radiant energy modulator and said modulation is optically connected to the photodetector.

9. A method of measuring inertial force comprising the steps:
mounting a mass in a housing for limited rectilinear movement along one axis of the mass;
attaching under tension said mass to a pair of optic fiber so that the pair of fibers are in rectilinear alignment along said one axis;
directing radiant energy into each of the pair of fibers;
detecting the radiant energy modified by movement of the mass;
directing the detached signal to a signal processor wherein the signal processor detects any phase difference in the rays traveling in said pair of fibers, which phase difference in the rays traveling in said pair of fibers, which phase difference is directly proportional to the force applied to the pair of fibers by movement of the mass along said one axis.

* * * * *

UNITED STATES PATENT AND TRADEMARK OFFICE
CERTIFICATE OF CORRECTION

PATENT NO. : 4,322,829

DATED : March 30, 1982

INVENTOR(S) : Davis et al

It is certified that error appears in the above-identified patent and that said Letters Patent are hereby corrected as shown below:

Claim 2 line 3 "mounting" should read ---mounted---.

Claim 9 line 16 cancel "which phase difference" a double inclusion in the Claim.

Signed and Sealed this

Thirteenth Day of July 1982

[SEAL]

Attest:

Attesting Officer

GERALD J. MOSSINGHOFF

*Commissioner of Patents and Trademarks*